July 23, 1957 W. D. KELLY 2,800,648
LIQUID LEVEL INDICATING DEVICE
Filed July 29, 1955 3 Sheets-Sheet 3
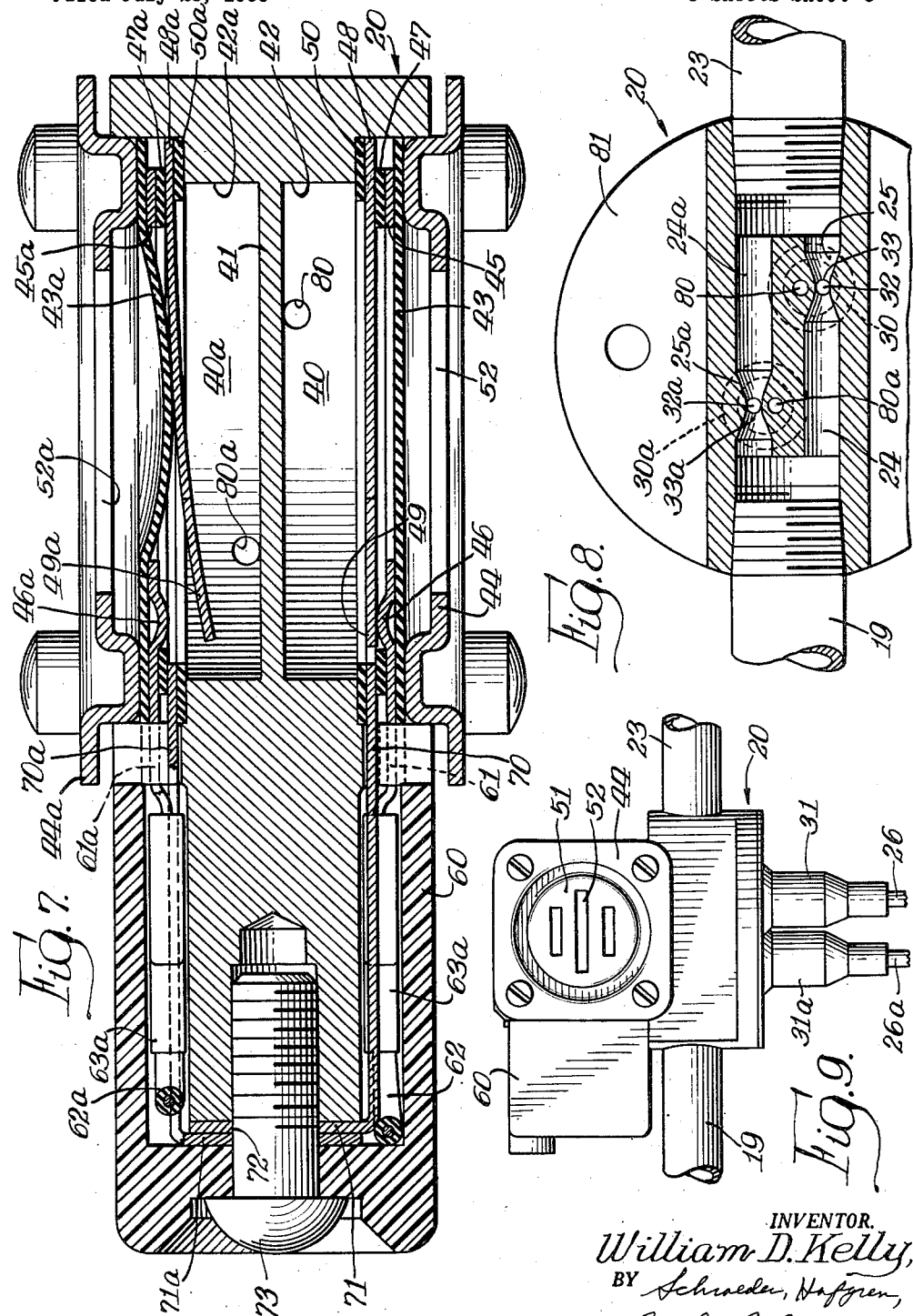
INVENTOR.
William D. Kelly,
BY Schroeder, Hofgren,
Brady & Wagner
Attys.

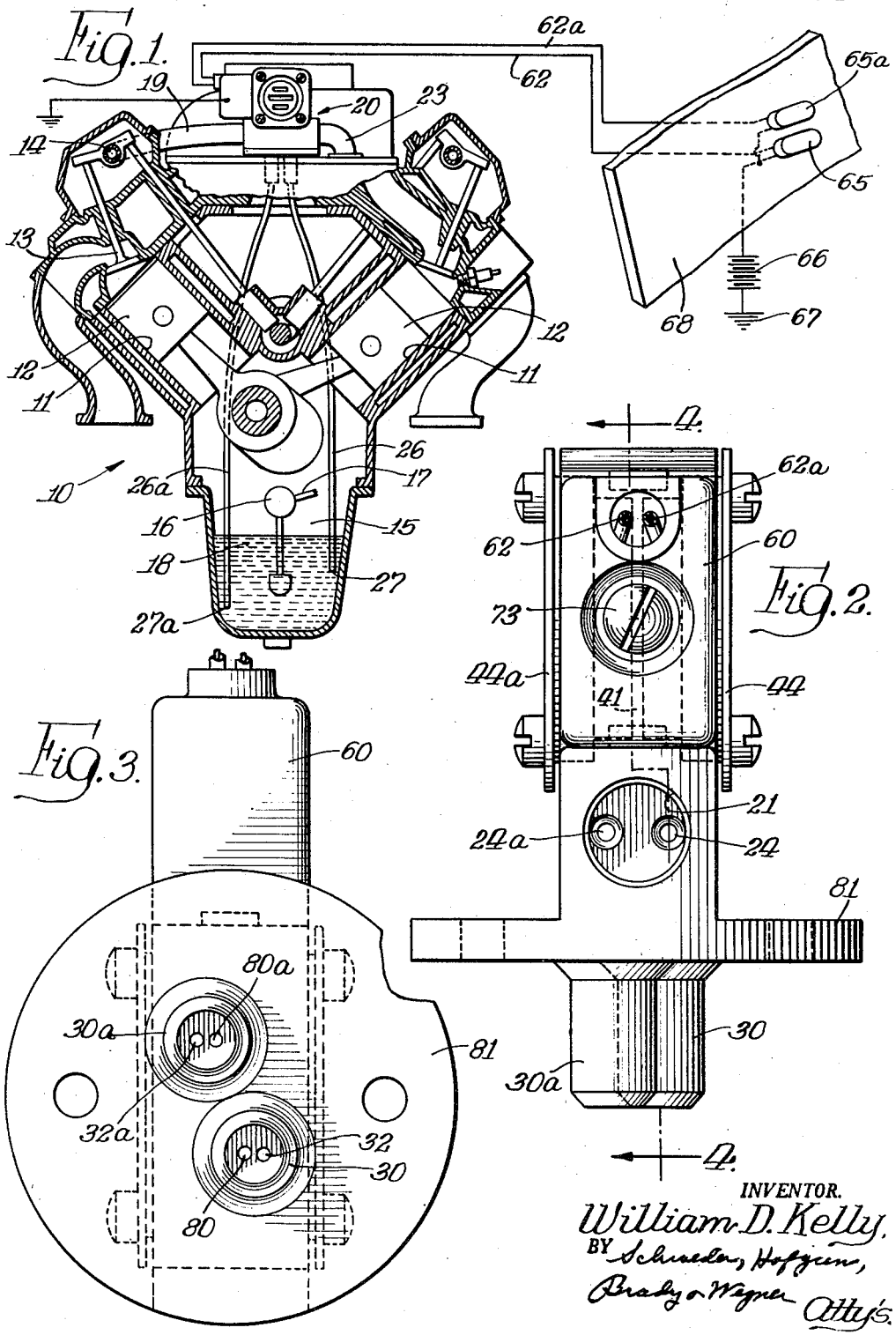

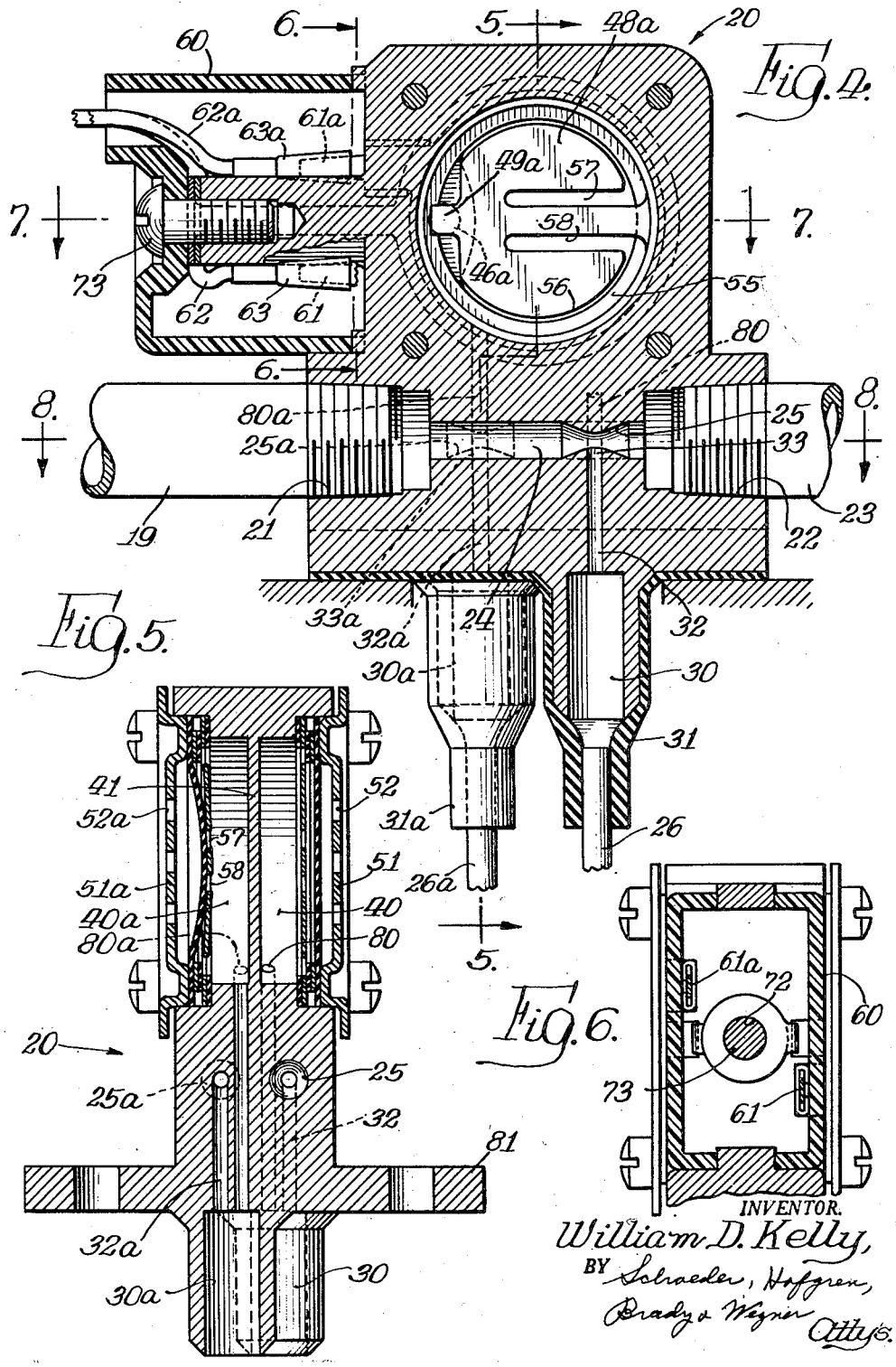

United States Patent Office 2,800,648
Patented July 23, 1957

2,800,648

LIQUID LEVEL INDICATING DEVICE

William D. Kelly, Western Springs, Ill.

Application July 29, 1955, Serial No. 525,239

4 Claims. (Cl. 340—244)

This application relates to a liquid level indicating device, and more particularly to a liquid level indicating device particularly adaptable for use to indicate the oil level in the crankcase of an internal combustion engine.

It is the general object of the present invention to provide a new and improved liquid level indicating device of the character described.

It is a more specific object of the invention to produce a liquid level indicating device particularly adaptable for use in conjunction with an internal combustion engine for indicating the oil level in the crankcase thereof and capable of giving a constant indication of any requirement for additional oil which should arise, even during engine operation.

The need has long been recognized for an indicating device of some sort to provide a visual signal indicative of the oil level in the crankcase of a modern automobile engine. It is presently the normal practice to provide little more than a dipstick for measuring oil level, and then only when the engine is stopped. Almost since the advent of the automobile, there has been a demand for an oil level indicator which not only would operate while the engine is running, but one which would operate automatically to indicate need for oil, particularly where the need was indicated in some fashion as to readily call the attention of the operator to the existence of such a condition.

According to the present invention, there is produced an oil level indicating means which fulfills the requirements above set forth, in that it is capable of providing a clearly visible warning signal when the oil level falls below a desired point, even though the engine be running and the vehicle be in motion.

The foregoing and other objects, advantages and features of the present invention will be readily apparent from the following description and drawings, in which:

Fig. 1 is a vertical, sectional view of a modern automobile engine showing the oil indicating device of the present invention used in conjunction therewith;

Fig. 2 is a view of the end of the casing housing certain of the mechanism of my device, enlarged to approximately twice normal size;

Fig. 3 is a bottom plan view of the apparatus shown in Fig. 2;

Fig. 4 is a sectional view taken along line 4—4 of Fig. 2;

Fig. 5 is a sectional view taken along line 5—5 of Fig. 4;

Fig. 6 is a sectional view taken along line 6—6 of Fig. 4;

Fig. 7 is a sectional view taken along line 7—7 of Fig. 4, but enlarged twice again over the dimensions of Fig. 4, thus being four times normal size;

Fig. 8 is a sectional view along line 8—8 of Fig. 4; and

Fig. 9 is a side elevational view in actual size of the apparatus shown in Fig. 2.

While this invention is susceptible of embodiments in many different forms, there is shown in the drawings and will herein be described in detail one specific embodiment, with the understanding that the present disclosure is to be considered as an exemplification of the principles of the invention and is not intended to limit the invention to the embodiment illustrated. The scope of the invention will be pointed out in the appended claims.

Referring now to Fig. 1 of the drawings, there is shown an internal combustion engine of the V type having a plurality of cylinders 11 in which pistons 12 are reciprocable, there being a plurality of valves 13 associated with each cylinder and operated by a rocker arm mechanism 14. At the lower portion of the engine there is provided a crankcase 15 having an oil pump therein directing its discharge into a discharge conduit 17 for circulation through an oil circuit, including the main and connecting rod bearings, rocker arms, etc. The crankcase 15 is adapted to hold a supply of oil indicated at 18. The pump withdraws oil from the crankcase and circulates it through the circuit just described, and for the purpose of operating the liquid level device of the present invention, there is provided an oil line 19 communicating with the oil circuit in the rocker arm 14, and with a casing 20 housing certain of the mechanism of the present invention.

Referring to Fig. 4, it will be noted that the casing 20 is provided with an inlet 21 connected to the oil line 19 and an outlet 22 connected to a discharge line 23 which may discharge oil back to the crankcase 15. The inlet and outlet 21 and 22 are interconnected by a pair of conduits 24 and 24a, each provided with a venturi section 25 and 25a intermediate the ends thereof.

Extending downwardly from the casing 20 and into the crankcase 15 are a pair of tubes 26 and 26a, each having an opening 27 and 27a respectively opening into the crankcase 15 at different levels. As illustrated in Fig. 1, the openings 27 and 27a are both below the level of the oil, and it is the purpose of the venturi sections just described to apply a constant suction to each of the tubes 26 and 26a to draw oil thereinto if their openings be below the oil level in the crankcase, or to draw air thereinto if the openings are above the oil level in the crankcase. Inasmuch as the pressure within the tubes 26 or 26a will vary depending upon whether or not oil or liquid is drawn thereinto, pressure responsive signaling means are provided which sense the pressure in the tubes and are capable of generating a signal in response to changes of pressure.

For the foregoing purposes, the tubes 26 and 26a terminate at their upper ends in the hollow interior portions 30 and 30a of a pair of necks extending from the lower portion of the casing 20, with each of the necks being surrounded by a rubber cover 31 and 31a. Extending from each hollow neck portion is a passage 32 and 32a opening respectively to the throats 33 and 33a of the venturis 25 and 25a, so as oil flows through the conduits 24 and 24a and through the venturis therein, the reduction of pressure at the throat thereof creates a suction in the passages 32 and 32a, and thus in the tubes 26 and 26a.

Formed in the upper portion of the casing 20 is a pair of chambers 40 and 40a (see Fig. 7). A common wall 41 separates the chambers from each other, while the side walls of the chambers are circular in form, as indicated at 42 and 42a. Diaphragms 43 and 43a form a movable outer wall for each of the chambers 40 and 40a respectively, with the diaphragms being retained in position by retaining rings 44 and 44a. Underlying the diaphragms is a pair of rings 45 and 45a, each carrying a contact 46 and 46a for purposes hereinafter to be described, while underlying rings 45 and 45a are annular rubber rings 47 and 47a which separate the rings 45 and 45a from wafer plates 48 and 48a, each carrying a contact 49 and 49a urged against the contacts 46 and 46a respectively by the natural resilience of the metal from which the wafer plates are formed. A second pair of annular rubber rings 50 and 50a completes the sandwich for each chamber as described. The outer surface of the diaphragm is protected by face plates 51 and 51a forming a part of the rings 44 and 44a, with each of the face plates being provided with ventilating slots 52 and 52a to permit atmospheric pressure at all times to be imposed against the outer faces of the diaphragm.

Referring specifically to Fig. 4, it will be noted that the wafer plate 48a (which is constructed similarly to plate 48) is provided with a rim 55 clamped between the annular rubber rings 47a and 50a, with the rim being separated from the balance of the circular wafer by a partial peripheral slot 56. A pair of inwardly extending slots 57 and 58 render the wafer plate extremely flexible, so that it can easily be moved by the diaphragm to the position of the contact 49a illustrated in Fig. 7.

The contacts 46—49 and 46a—49a form a part of an electrical signaling system, the electrical terminals of which are enclosed within a box-like housing 60 of insulating material. As best shown in Figs. 4, 6 and 7, the rings 45 and 45a have portions extended toward the housing 60 in the form of ears 61 and 61a to which wires 62 and 62a are attached through the medium of suitable couplings 63 and 63a. The wire 62 is connected to an indicating bulb 65 (Fig. 1), while the wire 62a is connected to the bulb 65a, with both bulbs being connected to a battery 66 and ground 67. Preferably the bulbs are mounted on the dashboard of the car, indicated by 68.

The wafer plates 48 and 48a which carry the contacts 49 and 49a respectively are each connected to the ground to complete an electrical circuit when the switches are closed, and for this reason are each provided with extending legs 70 and 70a bent inwardly at 71 and 71a respectively (Fig. 7), and provided with an opening 72 to receive a retaining bolt 73, which serves to hold the insulating housing 60 to the metal casing 20.

To collapse the chambers 40 and 40a, that is, to reduce the pressures therein in order to cause their diaphragms 43 and 43a to move inwardly, means are provided for establishing communication between the interior of each of said chambers and the tubes 26 and 26a. To this end a second passage 80 opens at one end into the interior of the hollow neck 30 (Figs. 4 and 5) and at the other end to the interior of the chamber 40 (Fig. 7). Another passage 80a establishes communication between the hollow 30a and the chamber 40a.

It is believed that the operation of my device is clear from the foregoing description. With the liquid levels in the crankcase at the position illustrated in Fig. 1, and with the engine running, the oil pump 16 draws in oil from the crankcase and discharges it into its circuit, including the discharge line 17 and various parts of the engine, including the rocker arm 14. The oil line 19 which connects with the rocker arm directs a portion of the oil from the pump through the conduits 24 and 24a, and thus through the venturis 25 and 25a, creating a pressure drop at the throats of the venturis, and thus reducing the pressure within the passages 32 and 32a and tubes 26 and 26a. The result of the suction applied to the tubes is to draw oil up into the tubes and the head of oil thus created produces a pressure drop, which is transmitted to the interiors of both chambers 40 and 40a by means of the passages 80 and 80a. The reduction of pressure below atmospheric in the chambers causes both diaphragms to collapse inwardly (and thus assume the position of the left-hand diaphragm of Fig. 7). This opens both switches and thus neither of the bulbs are lighted.

If the oil level drops so that the surface thereof is just at the opening 27 of the tube 26, there will result an intermittent covering and uncovering of the opening 27 by the oil level as the vehicle goes around turns or hits slight bumps in the road. This will produce a condition where sometimes air and sometimes oil is drawn into the tube 26 by the venturi action previously mentioned. When oil is drawn into the tube 26, the pressure drop in the chamber 40 is sufficient to maintain the switch open, but when air is drawn into the tube, it creates no hydrostatic head, and thus no pressure drop in the chamber 40. The contact 49 being biased toward the contact 46 will thus close the switch when the diaphragm 43 assumes the position shown in Fig. 7 as the result of air entering the tube 26. As previously indicated, this action is intermittent, and thus a flashing of the bulb 65 is produced.

If the oil level drops still further, the opening 27 will constantly be above the liquid level, and thus no intermittent action or flashing will occur, and the bulb 65 will be lit as a steady light. A further drop in the oil level toward the opening 27a of the tube 26a will cause the switch mechanism in the chamber 40a and the bulb 65a controlled thereby to go through the same steps as those previously described, where first an intermittent flashing of the bulb 65a would occur, followed by a steady light if the oil level drops to a point where it no longer occasionally covers the opening 27a.

The casing of the present invention is provided with a mounting plate or base indicated at 81, so that it may readily be mounted on the engine block, although obviously many other positions of mounting will readily suggest themselves to those skilled in the art.

I claim:

1. Apparatus for indicating the level of liquid in the crankcase of an internal combustion engine having an oil pump for circulating oil under pressure through an engine lubricating circuit comprising means forming a plurality of chambers each having a movable wall, a switch in each chamber and movable between open and closed positions, means biasing each switch toward one of said positions, each of said switches being arranged to be moved to its other position by collapsing movement of the wall of its chamber when the pressure therein is below atmospheric, a plurality of liquid passages, one for each chamber, opening into the crankcase at different levels, a pair of venturi sections in said circuit, each of said passages opening into a throat portion of a different venturi section, whereby a suction is applied to each passage, means for communicating the pressure in each passage to its associated chamber, whereby when the opening of a passage is above the liquid level substantially atmospheric pressure will exist in its associated chamber and the switch therein will be in said one position and when the opening of a passage is below the liquid level the pressure in its associated chamber will be below atmospheric to move the wall thereof and thereby move the switch therein to said other position, and signal means controlled by the switches to indicate a dangerously low level of oil in the crankcase when both switches are in said one position and to indicate less than a full supply of oil in the crankcase when one switch is in said one position and the other switch is in the other position.

2. The apparatus of claim 1 in which said signal means includes an electrical circuit controlled by each switch, and a bulb in each circuit energized when the switch is closed.

3. The apparatus of claim 2 in which said switches are closed when in said one position, whereby as the liquid level in the container falls from a point above the opening of a passage to a point below such opening the switch in the chamber associated with the last mentioned passage sequentially is open, is then intermittently opened and closed, and then is maintained closed.

4. Apparatus for indicating the level of liquid in a container for a mechanism having an oil pump for circulating oil under pressure through a mechanism lubricating circuit comprising means forming a plurality of chambers each having a movable wall, a switch in each chamber and movable between open and closed positions, means biasing each switch toward one of said positions;

each of said switches being arranged to be moved to its other position by collapsing movement of the wall of its chamber when the pressure therein is below atmospheric, a plurality of liquid passages, one for each chamber, opening into the container at different levels, a pair of venturi sections in said circuit, each of said passages opening into a throat portion of a different venturi section, whereby a suction is applied to each passage, means for communicating the pressure in each passage to its associated chamber, whereby when the opening of a passage is above the liquid level substantially atmospheric pressure will exist in its associated chamber and the switch therein will be in said one position and when the opening of a passage is below the liquid level the pressure in its associated chamber will be below atmospheric to move the wall thereof and thereby move the switch therein to said other position, and signal means controlled by the switches to indicate a dangerously low level of oil when both switches are in said one position and to indicate less than a full supply of oil when one switch is in said one position and the other switch is in the other position.

References Cited in the file of this patent

UNITED STATES PATENTS

| | | |
|---|---|---|
| 2,588,761 | Raby | Mar. 11, 1952 |
| 2,626,386 | Raby | Jan. 20, 1953 |
| 2,671,893 | Van Scoy et al. | Mar. 9, 1954 |
| 2,722,678 | Kelly | Nov. 1, 1955 |
| 2,728,070 | Kelly | Dec. 20, 1955 |